United States Patent [19]

Goltsos et al.

[11] Patent Number: 5,260,558
[45] Date of Patent: Nov. 9, 1993

[54] MEASUREMENTS USING BALANCED ILLUMINATION OPTICAL MICROSCOPY

[75] Inventors: William C. Goltsos, Burlington; Patrick N. Everett, Concord; Robert E. Knowlden, Waltham, all of Mass.

[73] Assignee: Massachusetts Institute of Technology, Cambridge, Mass.

[21] Appl. No.: 886,129

[22] Filed: May 20, 1992

[51] Int. Cl.$^5$ .............................................. G01J 1/32
[52] U.S. Cl. ................... 250/205; 250/572; 356/239
[58] Field of Search ............. 250/572, 560, 205, 341, 250/343; 356/239, 237, 392, 393, 394

[56] References Cited

U.S. PATENT DOCUMENTS

| | | | |
|---|---|---|---|
| 3,180,984 | 4/1965 | Fertig et al. | 250/341 |
| 4,360,586 | 11/1982 | Flanders et al. | 430/821 |
| 4,538,909 | 9/1985 | Bible et al. | 356/239 |
| 4,890,309 | 12/1989 | Smith et al. | 378/35 |
| 4,952,058 | 8/1990 | Noguchi et al. | 356/237 |

OTHER PUBLICATIONS

"Practical Method For Edge Detection Focusing For Linewidth Measurements on Wafers"; Optical Engineering; Jan. 1987 vol. 26 No. 1; pp. 81–85.

Primary Examiner—David C. Nelms
Assistant Examiner—Que T. Le
Attorney, Agent, or Firm—Robert F. O'Connell; Dike, Bronstein, Roberts & Cushman

[57] ABSTRACT

A technique for measuring the distance between the edges of a feature positioned on a substrate wherein the feature is illuminated with light on either side of the edges and the light intensities at either side of each of the edges are detected and are balanced at the detected light intensities regions sufficiently removed from the edges to prevent an adverse diffractive effect thereon so as to produce regions of minimum light intensity at the edges, the positions of which can be determined and the distance between said regions of minimum intensity can be measured.

10 Claims, 3 Drawing Sheets

MEASUREMENTS USING BALANCED ILLUMINATION OPTICAL MICROSCOPY

INTRODUCTION

This invention relates to techniques for measuring the dimensions of features on substrates and, more particularly, to a technique using balanced illumination of such features for such purpose.

BACKGROUND OF THE INVENTION

The ability to measure accurately the dimensions of certain features on a substrate can be of critical importance in many applications. As used here the term substrate is not intended to be limited in its meaning and is to mean any kind of base, or component member, in or on which a feature or a surface relief element is positioned. For example, substrates can contain electronic elements or components which form an electronic device and the dimensions of such elements or components can, to a large extent, determine the electrical properties and performance of the electronic device. Accordingly, accurate knowledge concerning such dimensions becomes important both in the design and fabrication of the device.

Further, in the field of diffractive optics, for example, the dimensions and placement of surface relief features on a substrate determine the optical properties and performance of an optical element so that accurate information thereof becomes important in the design and fabrication of such optical elements.

Hence, techniques for the measurement of such dimensions can be used as a powerful quality control tool in designing electronic, or optical, or other devices, particularly if such measurements can be easily performed, both quickly and accurately.

Currently used optical methods for measuring such dimensions use light image intensity threshold detection techniques, such as disclosed in the article of D. Nyyssonen, "A Practical Method for Edge Detection and Focusing for Linewidth Measurements on Wafers," SPIE 538 Optical Microlithography IV, 172-178 (1985). In accordance therewith a great deal of effort has been required in developing suitable algorithms for determining the edges of the feature whose edge-to-edge dimension is being measured from the imaged light intensity distribution with respect to the feature under examination. The combination of intensity amplitude and phase differences in the light images at the edges of the feature, as well as the cross-interference which occurs when the edges of the feature are within the same diffractive zone, create apparent off-sets in the positions of such edges. A suitable algorithm then has to be devised to take into account and to correct for such aberrations. Such techniques may often make use of a large number of "look-alike" standard features and provide for the matching of the unknown feature being measured with the closest "look-alike" standard, using a light image intensity threshold condition. It is often difficult to select the correct standard without some prior knowledge of the detailed physical and optical characteristics of the feature being measured and, when the measurement is made, it is often difficult to specify the acceptable operational tolerances for the measurement. Moreover, if the illumination, or other, conditions change, the equipment usually has to be re-calibrated.

Such techniques often do not permit sufficiently accurate measurements to be made because such measurements depend on a knowledge of the optical properties of both the feature and the substrate material and such properties are often not sufficiently well known. For example, diffraction effects and the details of the resultant diffraction patterns which occur during the measurements make an accurate interpretation of the edges of the feature difficult to achieve. Moreover, such techniques are not always easy to perform, nor can results therefrom be obtained quickly.

It is desirable then to provide a measurement technique which is more easily used and which accurately and quickly measures such dimensions but which does not require information as to the details of the diffraction effects involved or of the optical properties of the materials involved. Moreover, it is desirable that such technique be usable in a generally universal sense for measuring a large variety of different features without the need to devise special algorithms for correcting for the diffractive effects which may differ considerably from feature to feature.

BRIEF SUMMARY OF THE INVENTION

In accordance with a particular embodiment of the invention, a technique for measuring the dimensions of a feature on a substrate uses an optical microscope which is capable of providing simultaneous illumination on both surfaces of the substrate. The intensity of the illumination, as detected via the optical microscope, is then balanced so that the intensity levels as viewed by the optical microscope at either side of a feature edge at regions away from the diffractive zones at the edge, are substantially equal. Under such condition, a minimum intensity level is produced at the image of an edge of the feature. Such minimum intensity level can be readily detected at each edge of a feature to be measured and the distance between such minima can be readily determined so as to provide an accurate measurement of the edge-to-edge dimension of the feature.

More specifically, for a feature which is present on a substrate, wherein either the substrate is at least partially transparent or the feature is at least partially transparent, for example, an exemplary embodiment of the invention uses a pair of light sources for simultaneously illuminating the top and bottom of the substrate having features being measured. One light source, e.g., the top source, is arranged, for example, to produce light reflection from the feature to the optical microscope and the other light source, e.g., the bottom source, is arranged to produce light transmission through the substrate to provide an optical profile that is symmetric about each of the true edges of the feature. The center of symmetry thereof is in the form of a minimum amplitude intensity which can thereby be used to accurately locate each feature edge involved. The distance between the locations to such amplitude minima then accurately represents the edge-to-edge dimension of the feature.

A correct illumination balance in accordance with the above example can be achieved by adjusting the light intensity from one or both of the sources so that the intensities on either side of a feature edge as detected by the optical microscope are substantially equal. The detected intensities are balanced at sufficient distances from an edge on either side thereof so that any diffraction effects near the edge itself do not adversely affect the balancing procedure.

DESCRIPTION OF THE INVENTION

The invention can be described in more detail with the help of the accompanying drawings wherein FIG. 1 shows a block diagram of a preferred embodiment of the invention;

Figure 1:
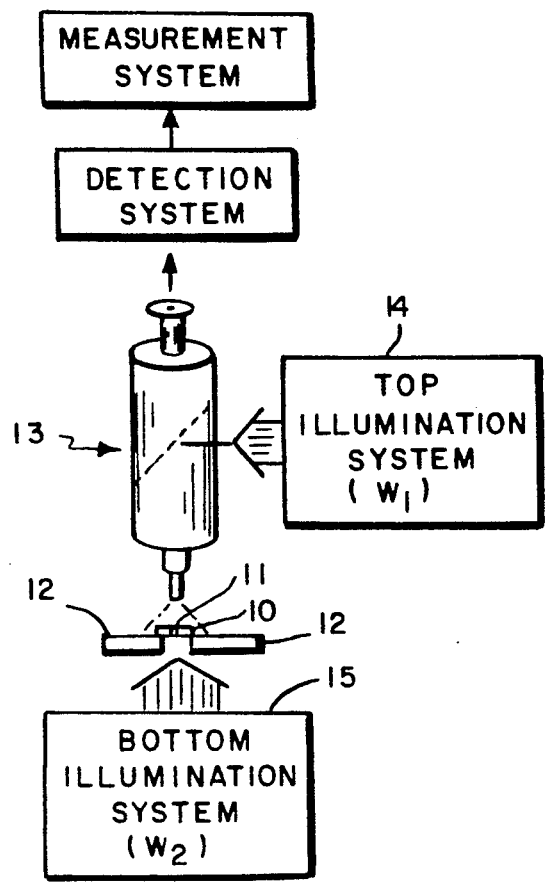
FIG. 1A shows a view in section of a portion of a feature whose dimensions are to be measured by the embodiment depicted in FIG. 1.
Figure 1A:
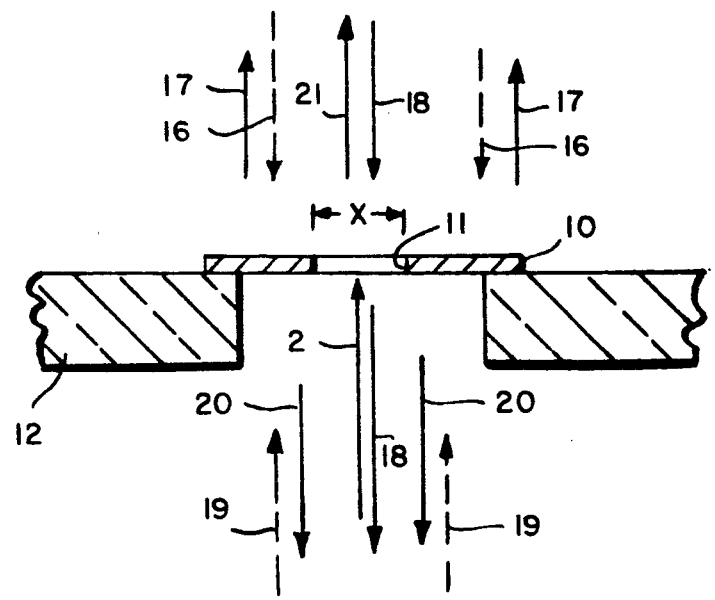

As can be seen in FIG. 1, with respect to a particular embodiment of the technique of the invention, an optically opaque substrate 10 has an optically transparent element, or feature, 11, for example, present therein. One example thereof would be a metal foil substrate having a pattern of one or more transparent apertures, or holes, therein, the substrate being supported about its periphery as shown by a suitable support member 12. The substrate and feature, shown enlarged in FIG. 1A, represent, for example, a metal foil 10 having a single optically transparent feature, such as a circular hole 11, therein. It is desired that the diameter of the feature 11 be measured, as indicated by the dimension "X" designated in FIG. 1A.

As depicted in FIG. 1, an optical microscope 13 is positioned above the substrate opposite the feature whose edge-to-edge dimension is to be measured. Associated with microscope 13 is a top illumination system 14 of variable intensity ($W_1$) which supplies light to the microscope 13, the light being arranged to be directed to the top surface of substrate 10 at the general vicinity of the feature to be measured. The combination of such an optical microscope together with a top illumination system is readily available to those in the art. One such combination is made and sold by Ernst Leitz GMBH of Wetzlar, Germany under the trade designation Model Leitz Ergolux AMC 6X6 Microscope.

In the particular embodiment depicted, a bottom illumination system 15 of variable intensity ($W_2$) is positioned below substrate 10 and provides light for illuminating the opposite bottom surface of substrate 10. Such a bottom illumination system can also be obtained as part of the above identified optical microscope/top illumination system combination. The light from system 15 is also arranged to be directed at the general vicinity of the feature to be measured.

As depicted in FIG. 1A, light from top illumination system 14, as shown by dashed line arrows 16, is reflected from the top surface of opaque substrate 10, as shown by solid arrows 17, while light directed at the transparent feature 11 portion thereof is transmitted into and through the feature 11, as shown by solid arrows 18.

Bottom illumination system 15 directs light, as shown by dashed line arrows 19, toward feature 11 as shown in FIG. 1A. Such light is reflected from the bottom surface of opaque substrate 10, as shown by solid line arrows 20, while the light directed at the transparent feature 11 is transmitted into and therethrough, as shown by solid arrows 21.

The top illumination reflected light 17 and the bottom illumination transmitted light 21 are directed toward optical microscope 13 and the combined intensities thereof are imaged and detected by a suitable detection means associated therewith at the image plane thereof.

Figure 2:
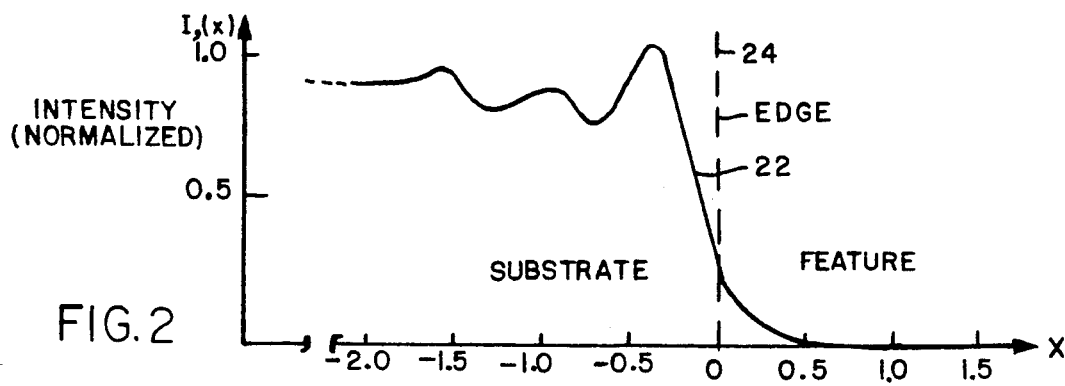
FIG. 2 shows a curve depicting the light intensity detected in the embodiment of FIG. 1 due to the top illumination of the feature in FIG. 1A.
Figure 3:
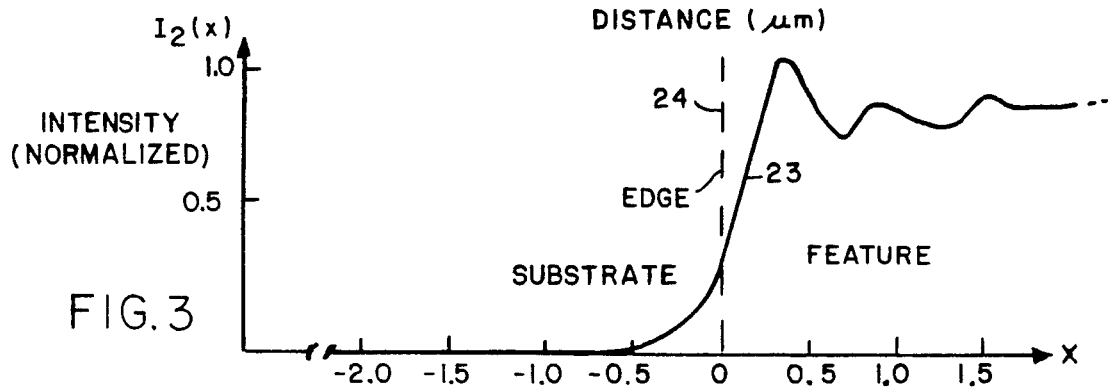
FIG. 3 shows a curve depicting the light intensity detected in the embodiment of FIG. 1 due to the bottom illumination of the feature in FIG. 1A.

Graphical representations of such detected intensities at one edge of exemplary feature 11 are illustrated in FIGS. 2 and 3. The curve 22 in FIG. 2, for example, depicts the detected image intensity $I_1(x)$ as a function of the distance x across substrate 10 at one edge of feature 11 due to the top illumination system, wherein light from top illumination system 14 is directed toward the substrate 10. Part of the light is reflected from the opaque substrate 10 to the detection system, at the substrate side of the edge, and part of the light is transmitted through aperture 11 at the feature side of the edge, which latter light does not reach the detection system. The reflected light intensity depicted by curve 22 is shown at the vicinity of one edge only of feature 11 in FIG. 2, a similar mirror-image curve (not shown) being detected at the other edge thereof.

FIG. 3 depicts the detected light intensity $I_2(x)$ due to the bottom illumination system, wherein light therefrom is directed to the substrate 10, curve 23 showing the light intensity, part of which is transmitted through the aperture 11 at the feature side of the edge to the detection system, and part of which is reflected from the opaque substrate 10 at the substrate side of the edge which latter light is not transmitted to the detection system. A similar mirror image curve (not shown) is detected at the other edge of feature 11.

The detected light intensity curves 22 and 23 shown in FIGS. 2 and 3 do not provide a clear demarcation at the edge involved (the edge location is illustrated therein by dashed lines 24 in the figures) and a finite slope of intensity as a function of distance x occurs in both curves at the vicinity of the edge due to diffraction effects.

In accordance with the invention, the detected intensities generally at regions 25A at either side of an edge away from the diffractive zone thereof due to the top and bottom illumination systems are then arranged to be balanced. Such intensities can be balanced, for example, by changing the intensity of the light from bottom illumination system 15, while keeping the intensity of light from top illumination 14 constant, or vice-versa, or by changing the intensities from each source to achieve such a balance.

Figure 4:
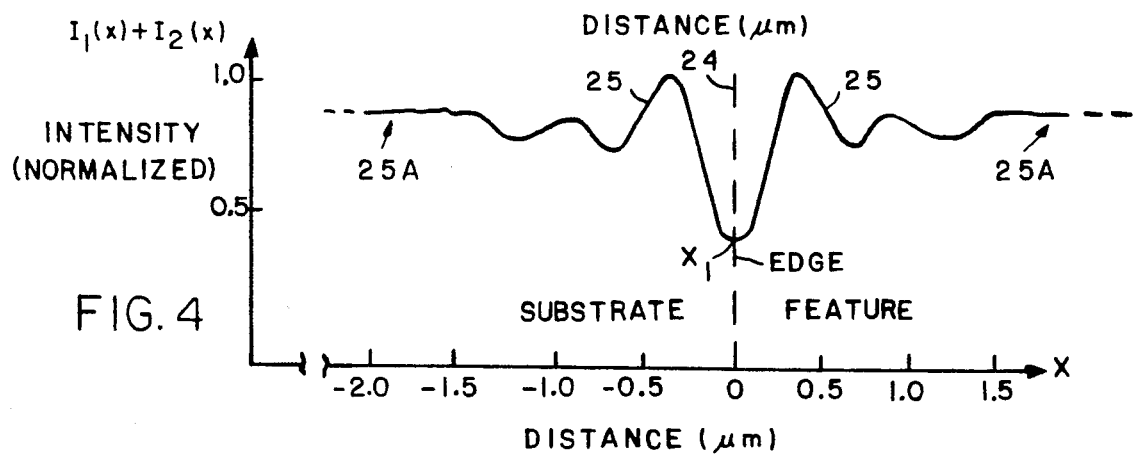
FIG. 4 shows a curve representing the combination of the curves of FIGS. 2 and 3.

When balanced, a curve 25 is obtained representing the sum of the intensities $I_1(x)$ and $I_2(x)$, as shown graphically in FIG. 4 (the intensities are effectively optically combined by the optical microscope), wherein it is found that, when a balancing of the intensities at regions 25A thereof is achieved, a clearly defined region of minimum intensity occurs at $x_1$, which corresponds to the dashed line edge 24 of feature 11, the minimum intensity thereby representing one edge of feature 11 to be measured.

A curve having a similar minimum representing the other edge of feature 11 can also be determined. The distance between the minima represents the edge-to-edge distance X (FIG. 1), i.e., the diameter of feature 11.

An exemplary well-known detector can be a suitable camera or video device which responds at an image plane to the optical output from optical microscope 13 and then supplies such detected intensity as an electrical signal to a measurement system such as a video display device, having electronic filars, for display thereon, as would be well known to the art. The display of such imaged intensities from the vicinity of one edge to that of another edge of the feature would show the regions of light intensities on either side of such edges generally as relatively light gray regions, although the level of the intensities on either side would not necessarily be equal. In order to balance such intensities to achieve such equality, in a particular embodiment as discussed above, the intensity of the transmitted light from the bottom illumination system, for example, is varied until the intensity of the transmitted light on one side of an edge, at a region away from the diffractive zone thereof, transmitted through the optically transparent feature 11 in the substrate 10 in the above example, is made equal to the intensity of the reflected light from the top illumination system as reflected from the substrate 10 on the substrate side of the edge of feature 11 at a region away from the diffractive zone thereof. Such balancing of the intensities can be achieved by visually examining the display until the intensities at either side of each of the edges away from the diffractive zone appear to be the same or by electronically comparing the electrical signals, representing such intensities, which are supplied to the display, and varying the intensity of the bottom illumination until the intensities at either side are electrically equal.

Alternatively, the balancing can be achieved by directly viewing the edge region with the human eye at the eyepiece of the microscope using a pair of movable mechanical filars therein. The eye in effect acts as a detector which permits the intensities to be balanced at either side of an edge by the direct viewing thereof.

Figure 5:
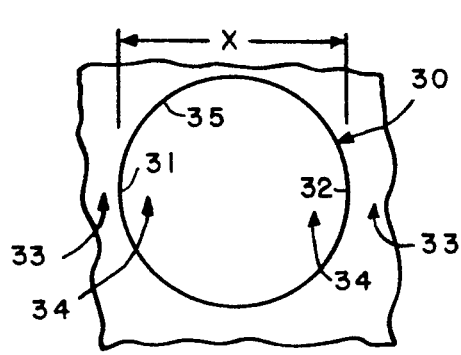
FIG. 5 shows a display of the light intensities at the edges of the feature of FIG. 1A.
Figure 6:
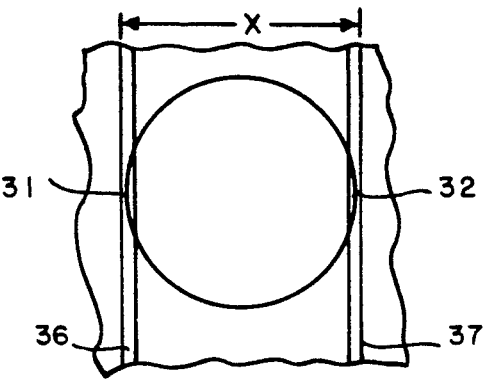
FIG. 6 shows a display of the light intensity of FIG. 5 depicting electronic filars as used therewith.

It is found that, in accordance with the invention, when such balancing operation has been performed (as shown by the curve 25 and regions 25A in FIG. 4), the edges are represented in the display as regions of minimal intensity, i.e., either black, or relatively dark, regions. A typical display is illustrated in FIG. 5 wherein a feature such as circular opening 30, for example, has edges regions 31 and 32 and the distance X between them (i.e., the diameter of the opening) is to be measured. As can be seen therein, the intensities at the regions 33 and 34 at either side of the edges 31 and 32 are made substantially equal and the black or dark circular line 35 of minimal intensity represents the location of the peripheral edge of feature 11. A pair of movable electronic filars 36 and 37 in FIG. 6 (exaggerated in the figure), associated with the display device, can then be moved so as to be aligned with the dark edge regions 31 and 32, as shown in FIG. 6, and the distance between the filars then represents the edge-to-edge distance X of the feature 30. A digital number can be obtained from the measurement system, for example, which number represents the distance X. If measurement is made directly using the eyepiece of the microscope, the feature and the mechanical filars of the eyepiece will appear as shown in FIG. 5 and 6 and the mechanical filars can be moved appropriately to measure the distance X.

Figure 7:
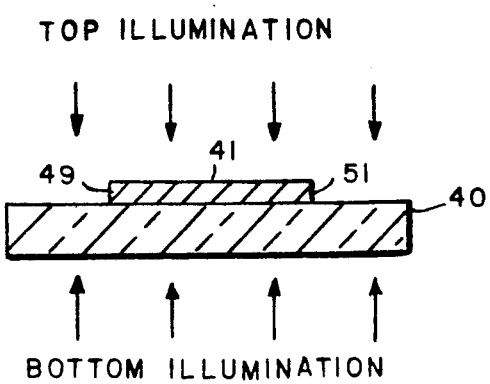
FIG. 7 shows another feature whose dimensions are to be measured by the embodiment of FIG. 1.
Figure 8:
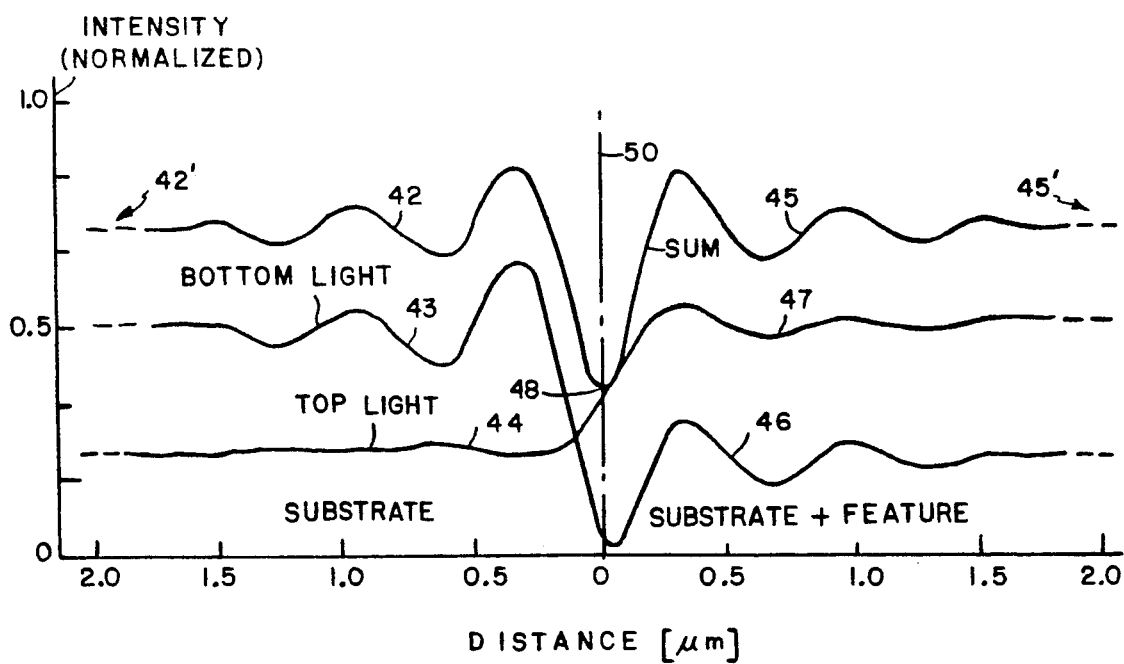
FIG. 8 shows curves representing the light intensities detected in the embodiment of FIG. 1 due to the top and bottom illumination of the feature of FIG. 7 and a further curve representing the combination thereof.

Another example of such a measurement is discussed with reference to FIG. 7 wherein the object to be measured has a variation in intensity about the feature edges. One example thereof is a photoresist pattern on a quartz substrate. As shown in FIG. 8, a substantially transparent, but partially reflective quartz substrate 40 has a pattern or feature of substantially reflective, but partially transparent, photoresist material 41 thereon.

In such embodiment, as shown in FIG. 8, curve 42 represents the combination of the curve 43 representing the intensity of transmitted light from the bottom illumination system and of curve 44 representing the intensity of reflected light from the top illumination system, respectively, at the substrate side of an edge 49, while curve 45 represents the combination of curve 46 representing the intensity of light transmitted through the substrate and feature side of the edge due to the bottom illumination system and of curve 47 representing the intensity of light reflected at the substrate and feature side of the edge due to the top illumination system.

The intensities from one, or both, of the top and bottom illumination systems are adjusted to produce substantially equal image intensities at each side of the edge at regions 42' and 45' removed from the diffractive zones at and near the edge region. A minimum intensity region 48 then occurs at the edge of the photoresist material feature, as shown by dashed line 50.

Curves 43/46, 44/47 represent curves of the light intensities as detected by the detection system from the bottom and top illumination sources, respectively, when the above balance of curves 42'/45' has been achieved, the ratio of transmitted light from the bottom illumination source at the substrate side of the edge to transmitted light from the bottom illumination source at the photoresist side of the edge being about 70:30, while the ratio of reflected light from the top illumination source at the substrate side of the edge to reflected light from the top illumination source at the photoresist side of the edge being about 30:70. The phase difference between the imaged reflected top light at the photoresist side and at the substrate sides is about 160°, while the phase difference between the imaged transmitted bottom light at the photoresist side and at the quartz side is about 30°. Such specific ratios and phase differences are exemplary values, only, for illustrative purposes, for a specific photoresist/quartz substrate embodiment. It is found that, even if the balancing is not as exact as that shown in FIG. 8, an effective minimum at an edge of the feature will still be detected and will provide a sufficiently accurate determination of the edge to be useful.

A similar balancing of imaged light intensities at the other edge 51 of the feature 41 shown in FIG. 8 can be made to obtain a minimum intensity at such edge and the distance between the minima can be appropriately measured as discussed above with reference to FIGS. 5 and 6.

While the above examples discusses the measurement of a transparent feature on an opaque substrate or of a partially transparent, partially reflective feature on a partially transparent, partially opaque substrate, the invention can be used in any context where the light intensities at either side of the edges of a feature are characterized by variations in phase or amplitude, or both, and can be suitably illuminated for viewing by an optical microscope and a suitable display so that the light intensities at either side of the edges can be balanced. So long as a balanced condition can be achieved, minimum light intensity regions at the edges can be detected and the distance between them can be determined. The frequency of the light used for such illumination need not be in the visible region of the spectrum, but can be selected at any spectral region, and the term light, as used herein, will be deemed to include electromagnetic energy at any appropriately selected frequency. In all cases, the illuminations or portions thereof reaching the detector at either side of a feature edge are preferably matched in coherence, wavelength, and angular spread. Other modifications may occur to those in the art within the spirit and scope of the invention.

Hence, the invention is not to be construed as limited to the particular embodiments described above, except as defined by the appended claims.

What is claimed is:

1. A method of identifying a discontinuity in an object comprising the steps of
    directing light to the discontinuity and to regions on each side of said discontinuity;
    detecting the light intensities at the regions on each side of the discontinuity;
    balancing the light intensities at the regions on each side of said discontinuity so as to produce a minimum intensity at said discontinuity for identifying said discontinuity.

2. A method of measuring the distance between discontinuities on an object comprising the steps of
    directing the light to said discontinuities and to regions on either side of each of said discontinuities;
    detecting the light intensities at the regions on each side of each of said discontinuities;
    balancing the detected light intensities at the regions on each side of each of said discontinuities so as to produce minimum light intensities at said discontinuities;
    detecting locations of said minimum light intensities produced at each of said discontinuities;
    determining the distance between the detected minimum light intensity locations.

3. A method in accordance with claim 2 wherein light diffractive zones occur substantially at and near each of said discontinuities,
    whereby the detected light intensities that are balanced are detected light intensities at regions removed from said diffractive zones.

4. A method in accordance with claims 1 or 2 wherein said object is a feature positioned on or in a substrate and said discontinuities are edges of said feature.

5. A method in accordance with claim 4 wherein said feature is a transparent feature in an opaque substrate whereby light is transmitted through the transparent feature in said substrate, and further wherein
    light is directed on to upper and lower surfaces of said opaque substrate at said feature edges from above and from below said feature edges, respectively, the detected light intensities on one side of each of said feature edges represents light directed from above said feature and reflected form said opaque substrate and the detected light intensities on the other side of each of said feature edges represents light directed from below said feature and transmitted through said transparent feature.

6. A method in accordance with claim 4 wherein said feature is at least partially opaque and said substrate is at least partially opaque, wherein light is directed on to said feature edges from above and from below said feature edges, the detected light intensities on one side of each of said feature edges represent light reflected from said partially opaque substrate and light partially transmitted through said partially opaque substrate and the detected light intensities on the other side of each of said feature edges represent light reflected from said partially opaque feature and light transmitted through said partially opaque feature and said partially opaque substrate.

7. A system for measuring the distance between discontinuities of an object comprising
    means for positioning said object having oppositely disposed surfaces;
    first means for illuminating the discontinuities at one of said oppositely disposed surfaces of said object;
    second means for illuminating the discontinuities at the other of said oppositely disposed surfaces of said object;
    means for detecting the light intensities at either side of the discontinuities;
    means for balancing the detected light intensities at either side of said discontinuities to produce minimum light intensities at said discontinuities;
    means for determining the locations of said minimum light intensities; and
    means for measuring the distance between said detected minimum light intensities.

8. A system in accordance with claim 7 wherein said object is a feature positioned on a substrate and said system is used to measure the distance between edges of said feature, and further wherein
    said positioning means is a microscope stage;
    said light intensity detecting means is a microscope;
    said balancing means includes means for varying the light intensity of the illumination from at least one of said first and second illuminating means.

9. A system in accordance with claim 8 and further wherein said determining means is a video monitor means having a display screen, said video monitoring means being responsive to the light intensities detected by said microscope for displaying the light intensities detected at either side of the edges of said feature whereby said balancing means varies the light intensities of the illumination from at least one of said first and second illuminating means so that the light intensities displayed at either side of each of said feature edges can be balanced and the minimum light intensity regions representing said feature edges are displayed on said display screen.

10. A system in accordance with claim 9 and further wherein said distance measuring means comprises electronic filars movably displayed on said display screen, said filars being moved to positions at which they correspond to said minimum light intensity regions.

* * * * *